United States Patent
Smith et al.

(10) Patent No.: US 7,675,444 B1
(45) Date of Patent: Mar. 9, 2010

(54) HIGH VOLTAGE ISOLATION BY CAPACITIVE COUPLING

(75) Inventors: Benjamin Alan Smith, Greenville, TX (US); Ken Tang, Frisco, TX (US); Victor Levi, Farmers Branch, TX (US); Jeff Owens, Frisco, TX (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 12/235,888

(22) Filed: Sep. 23, 2008

(51) Int. Cl.
*H03M 1/00* (2006.01)

(52) U.S. Cl. .................. 341/141; 341/143; 341/155

(58) Field of Classification Search ........... 341/141, 341/143

See application file for complete search history.

(56) References Cited

U.S. PATENT DOCUMENTS 6,611,553 B1 * 8/2003 Scott et al. ............... 375/220

7,003,023 B2 * 2/2006 Krone et al. ............... 375/219

OTHER PUBLICATIONS

Texas Instruments, 'One Megabit per Second Triple Digital Isolators' [Product Data-Sheet]. Published May 2008, pp. 1-16.

* cited by examiner

*Primary Examiner*—Khai M Nguyen
(74) *Attorney, Agent, or Firm*—North Weber & Baugh LLP

(57) ABSTRACT

The present invention comprises a circuit for transferring N inputs, wherein N is greater than or equal to 2, across a capacitive coupling media comprising a line circuit, a coupling capacitor, and a neutral potential circuit. The line circuit comprises: (1) a data converter for each input, for sampling and converting the N inputs; (2) a multiplexer for combining the outputs of the N data converters and a synchronization signal to generate an unencoded composite bit stream; (3) a data encoder for encoding the composite bit stream. The capacitor couples the encoded composite bit stream to a data decoder. The neutral potential circuit comprises: (1) the data decoder for decoding the coupled composite bit stream, and generating a recovered data stream and a recovered clock; (2) a synchronization recovery, control logic, and de-multiplex function for providing a set of digital outputs that correspond to the inputs to the data converters.

27 Claims, 4 Drawing Sheets

| Bit time | 0 | 1 | 2 | 3 | 4 | 5 | 6 | 7 | 8 | 9 | 10 | 11 | 12 |
|---|---|---|---|---|---|---|---|---|---|---|---|---|---|
| Value | $A_0$ | $B_0$ | 1 | $A_1$ | $B_1$ | 0 | $A_2$ | $B_2$ | 1 | $A_3$ | $B_3$ | 0 | $A_4$ |

HIGH VOLTAGE ISOLATION BY CAPACITIVE COUPLING

BACKGROUND

A. Technical Field

The present invention relates generally to coupling data from a high-voltage line side to a low-voltage data transmission side of a system where the coupling is facilitated by means of a mutual inductance (for example a transformer), or by means of a set of optical couplers. Such systems have particular relevance to electricity usage meter applications.

B. Background of the Invention

The industry requirements for electricity usage metering are evolving rapidly and becoming more challenging for both the meter design companies and the providers of electricity metering equipment. The electric utility and the energy consumer want accurate metering, but also want cost effective solutions. With huge amounts of power measured constantly, each KWH that is monitored inaccurately represents significant money to the power companies or to the consumers.

Current schemes for collecting information from geographically distributed sources, for example utility meters, present a number of problems. Manual data collection methods such as those employing human meter readers are error prone and costly. Accordingly, utility companies have embraced automated data collection technologies via data networks. Wired data network interfaces, however, must be isolated from the line power line. This requirement demands a cost effective and electrically efficient method of coupling the metering information between the power line and the data network.

One of the challenges to effective implementation of a data network interface is that the metering environment is often noisy and subject to high-voltage spikes. These voltage spikes can be as high as 2K volts. The common solution is to provide the necessary isolation between the line and the data network by such devices as transformers or optical couplers. Both solutions have significant disadvantages.

In the case of line-side transformers, these devices are capable of isolating the voltages of interest and are typically wound on a split bobbin. Thus, transformers are large (occupying a great deal of board space), heavy and expensive. Also, transformers may introduce phase shift that must be compensated by other means in the meter. Further, transformers that connect directly to the line are likely to dissipate heat, which shortens the life of the equipment and constitutes a safety risk as insulating materials age.

Relative to optical couplers, if optical couplers are used in the analog data path, even the best optical couplers are highly non-linear, requiring hardware or software to linearize the transfer function. Moreover, If optical couplers are used in the digital path, the optical coupler must be fast enough to support the data rate of interest, typically greater than 10,000 bits, per second. However, inexpensive optical couplers can support only about half this data rate.

Accordingly, what is needed is a method to couple data from the high voltage line side to the low voltage data transmission side of a system, such as an electricity usage meter, that is accurate and cost effective.

SUMMARY OF THE INVENTION

Embodiments of the present invention provide systems, devices and methods for using electrical capacitance across a dielectric as the coupling medium, and unique data encoding techniques to couple multiple channels of information accurately across a high-voltage isolation barrier.

The present invention comprises a circuit for transferring N inputs, wherein N is greater than or equal to 2, across a capacitive coupling media comprising a line circuit, a coupling capacitor, and a neutral potential circuit. The line circuit comprises: (1) a data converter for each input, for sampling and converting the N inputs; (2) a multiplexer for combining the outputs of the N data converters and a synchronization signal to generate an unencoded composite bit stream; (3) a data encoder for encoding the composite bit stream, wherein the requirement for the encoded composite bit stream may comprise: (1) regardless of the input to the data encoder, the encoded composite bit stream has zero DC bias; (2) regardless of the input to the data encoder, the encoded composite bit stream has the characteristic that each bit time contains no fewer than one signal transition; (3) and the encoded composite bit stream has a frequency sufficiently high such that the capacitive reactance of the coupling circuit ($1/2\pi fC$) is low when coupling across a low-value (and concomitantly low-cost) capacitor. Using a typical capacitor value of 100 pF, a 1 MHz signal would give rise to a capacitive reactance of about $1,592\Omega$. Impedance values in this range are suitable for receiver/decoder circuits that employ a high-impedance front end amplifier. In the preferred embodiment, a bit rate of 2 MHz is used. The capacitor couples the encoded composite bit stream to a data decoder.

The neutral potential circuit may comprise: (1) the data decoder for decoding the coupled composite bit stream, and from this generating a recovered data stream and a recovered clock; (2) a synchronization recovery, control logic, and de-multiplex function, for receiving the recovered data stream and a recovered clock coupled from the data decoder, for detecting the synchronization bit stream, and for providing a set of digital outputs that correspond to the inputs to the data converters.

In various embodiments, the data encoder may be a Manchester encoder, the output of which is an encoded bit stream that contains no fewer than one signal level transition per bit, and may be decoded to recover the original composite unencoded bit stream and a bit synchronization clock. Correspondingly, a Manchester decoder may be used to decode the composite bit stream.

In various embodiments, the de-multiplexer may be a N+1 bit shift register that may receive the recovered clock coupled from the data decoder, and may receive the data stream coupled from the control logic, and may provide a synchronization bit coupled to a synchronous detector, and may provide the set of digital outputs corresponding to the inputs of the data converters.

In various embodiments, there are multiple line circuits, in close proximity to one another, where the potential difference between the line circuits may be greater than 1500 volts; whereas the multiple neutral potential circuits have a potential difference approximately equal to their operating voltage.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

Figure ("FIG.") 1A illustrates a system for transferring information of N inputs from a high voltage environment to a low voltage environment, utilizing capacitive coupling, according to various embodiments of the invention.

DETAILED DESCRIPTION OF THE PREFERRED EMBODIMENTS

Embodiments of the present invention provide systems, devices and methods for using electrical capacitance across a dielectric as the coupling medium, and unique data encoding techniques to couple multiple channels of information accurately across a high-voltage isolation barrier. In various embodiments, this invention facilitates a dedicated electricity measurement apparatus that collects and calculates polyphase voltage, current, power, energy, and many other metering and power quality parameters of a poly phase load.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different electrical components, circuits, devices and systems. The embodiments of the present invention may function in various different types of environments wherein information is transferred in high voltage applications. Structures and devices shown below in block diagram form are illustrative of exemplary embodiments of the invention and are meant to avoid obscuring the invention. Furthermore, connections between components within the figures are not intended to be limited to direct connections. Rather, connections between these components may be modified, re-formatted or otherwise changed by intermediary components.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1A:
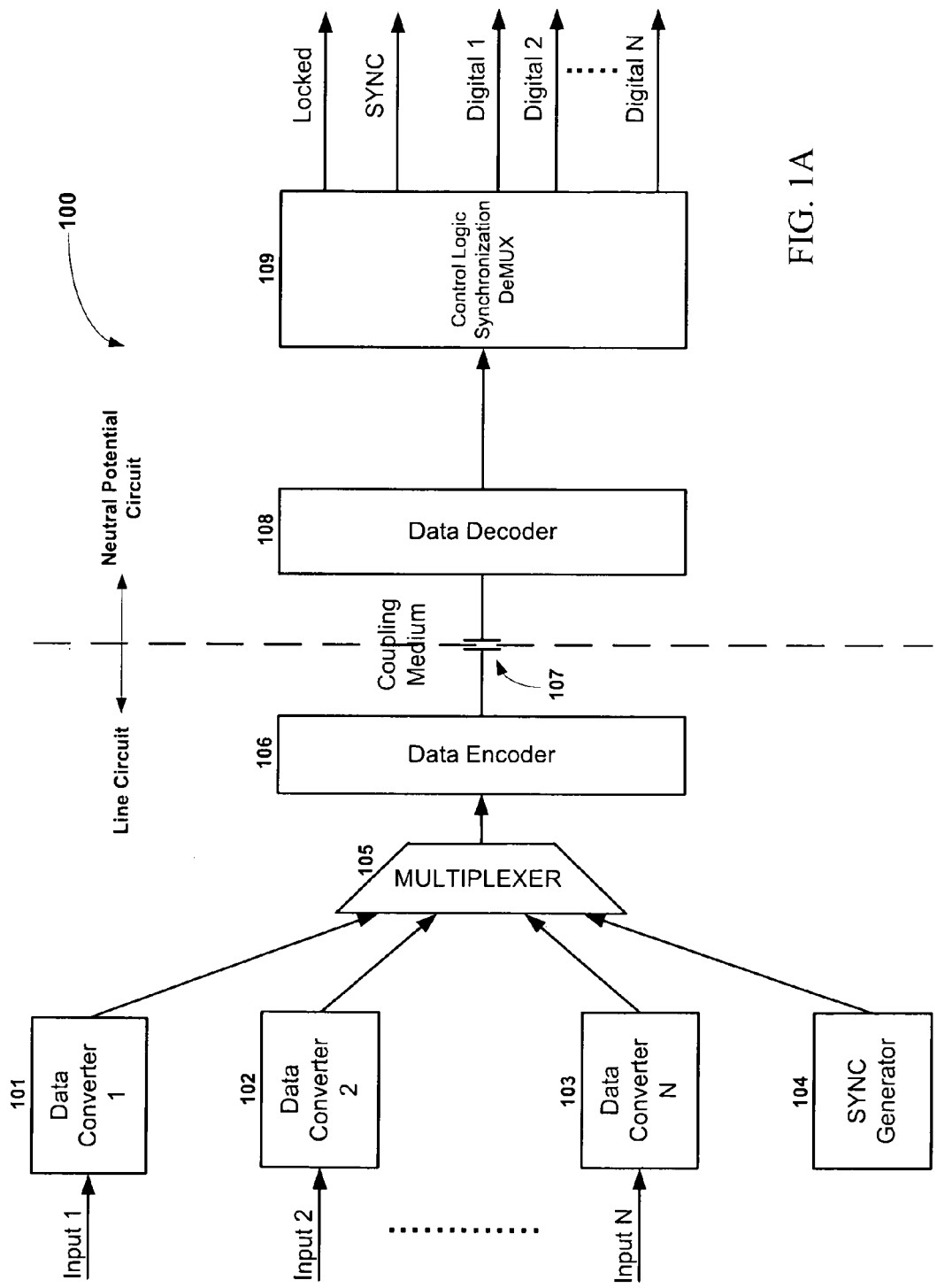
FIG. 1B illustrates the same overall functionality as FIG. 1A, but provides more details for the control logic, synchronization recovery, and de-multiplex functions of the low voltage environment, according to various embodiments of the invention.

FIG. 1A generally illustrates a system for transferring a set of two or more input signals to digital signal processing devices such that the source of the input signals are electrically isolated from the digital signal processing device and from one another. Within an electricity meter environment, there are typically several circuits, equivalent to the functionality of FIG. 1A integrated within a meter. Hence, the circuits are in close proximity to one another. Structurally, the data converters 101, 102, 103, the multiplexer 105, and the data encoder 106 may be considered a line circuit, inasmuch as they receive inputs at line potential voltages. Since in a typical meter environment, multiple line circuits are in close proximity of one another, line circuits may experience a voltage surge from the other line inputs. The line circuits may be typically less than 2 inches from one another. The potential difference between the line circuits may be greater than 1500 volts. Thus, there is a need to provide isolation within the system.

On the other side of the coupling medium 107, the data decoder 108, a digital logic block 109, comprising control logic, synchronization recovery, and de-multiplexer, may be consider a neutral potential circuit. Due to the benefit of the isolated coupling medium 107, the potential difference between the neutral potential circuits is within the range of the operating voltages of the circuits. The operating voltages for these circuits may be on the order of two volts. Multiple neutral potential circuits may be integrated on a single semiconductor device.

According to various embodiments of the invention, data converters 101, 102, 103 provide a sampling mechanism capable of converting a set of two or more input signals into a corresponding set of two or more sample bit streams. These inputs to the data converters are illustrated as Input 1, Input 2, and Input N. These inputs may be analog or digital signals.

The multiplicity of sample bit streams, along with a synchronization source 104 that is capable of generating an easily recovered synchronization bit stream, are combined in multiplexer 105 to generate a synchronization unencoded composite bit stream. This bit stream is coupled to an encoder capable of producing an encoded signal suitable for presentation to a capacitive isolation medium. Requirement for this encoder may comprise that (1) regardless of the input to the encoder, the output of the data encoder has zero DC bias, and (2) regardless of the input to the encoder, the encoded signal has the characteristic that each bit time will contain no fewer than one signal transition. Additionally, the encoder output frequency may be sufficiently high to minimize capacitance value and thus the concomitant cost of the coupling capacitor. The higher the coupling frequency means a lower capacitance value can be used for efficient coupling of the signal.

As illustrated in FIG. 1A, the encoded composite bit stream from the data encoder 106 is coupled across the capacitive coupling medium 107, and coupled to data decoder 108. These data decoders incorporate the appropriate decoding algorithm to decode the signal generated by data encoder 106. Hence, data decoder 108 is capable of recovering the unencoded composite bit stream and a bit synchronization clock signal from the signal delivered at the output of the isolation medium. The recovered data stream and recovered clock is then coupled to a digital logic block 109 comprising control logic, synchronization recovery function, and de-multiplex function.

The synchronization recovery function is capable of detecting the synchronization bit stream. Collectively, the functions in the digital logic block 109 are capable of producing a set of independent bit streams that are functionally identical to the set of bit streams produced by the sampling mechanism. These bit streams are illustrated in FIG. 1A as Digital 1, Digital 2 and Digital N, and correspond to Input 1, Input 2 and Input N. The control logic of block 109 also provides a SYNC bit output and a Locked output.

Figure 1B:
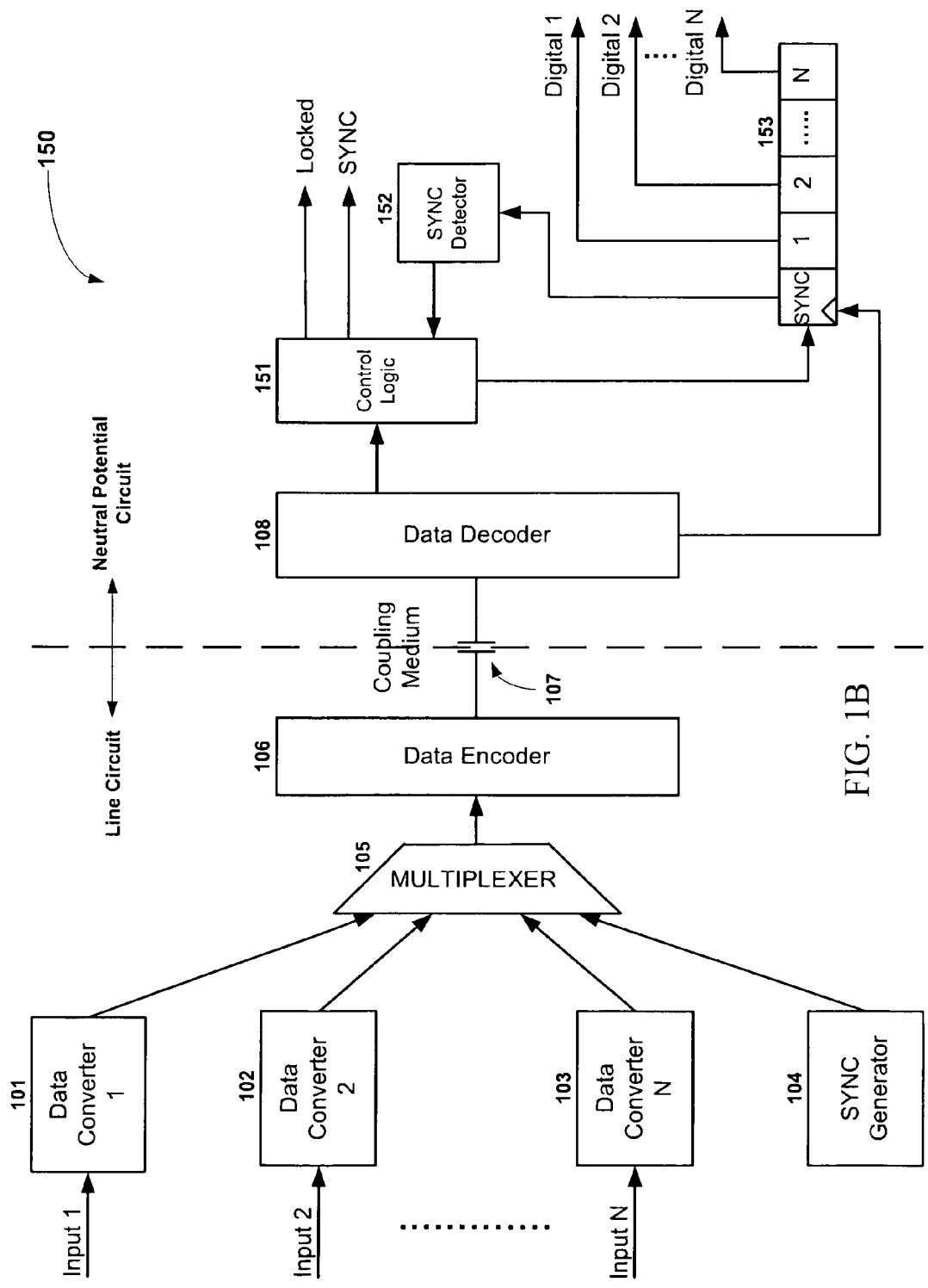

FIG. 1B illustrates the same functionality as FIG. 1A except that the details of digital block 109 are shown for an embodiment of the invention. The functions of digital block 109 comprise a control logic block 151, a synchronization detector 152, and a 1+N bit shift register 153. The control logic function 151 receives the recovered data stream coupled from the data decoder 108 and receives a synchronization control signal coupled from a synchronous detector 152, and provides a synchronization signal output, a lock signal output and a data stream output. The demultiplex function is a N+1 bit shift register 153 that receives the recovered clock coupled from the data decoder 108, and receives the data stream coupled from the control logic 151, and provides a synchronization bit coupled to the synchronous detector 152, and provides separate digital outputs corresponding to the inputs. The synchronization detector 152 interprets the synchronization bit coupled from the shift register, and providing a synchronization control signal to the control logic. Synchronization recovery will be discussed further in the following paragraphs.

Figure 2:
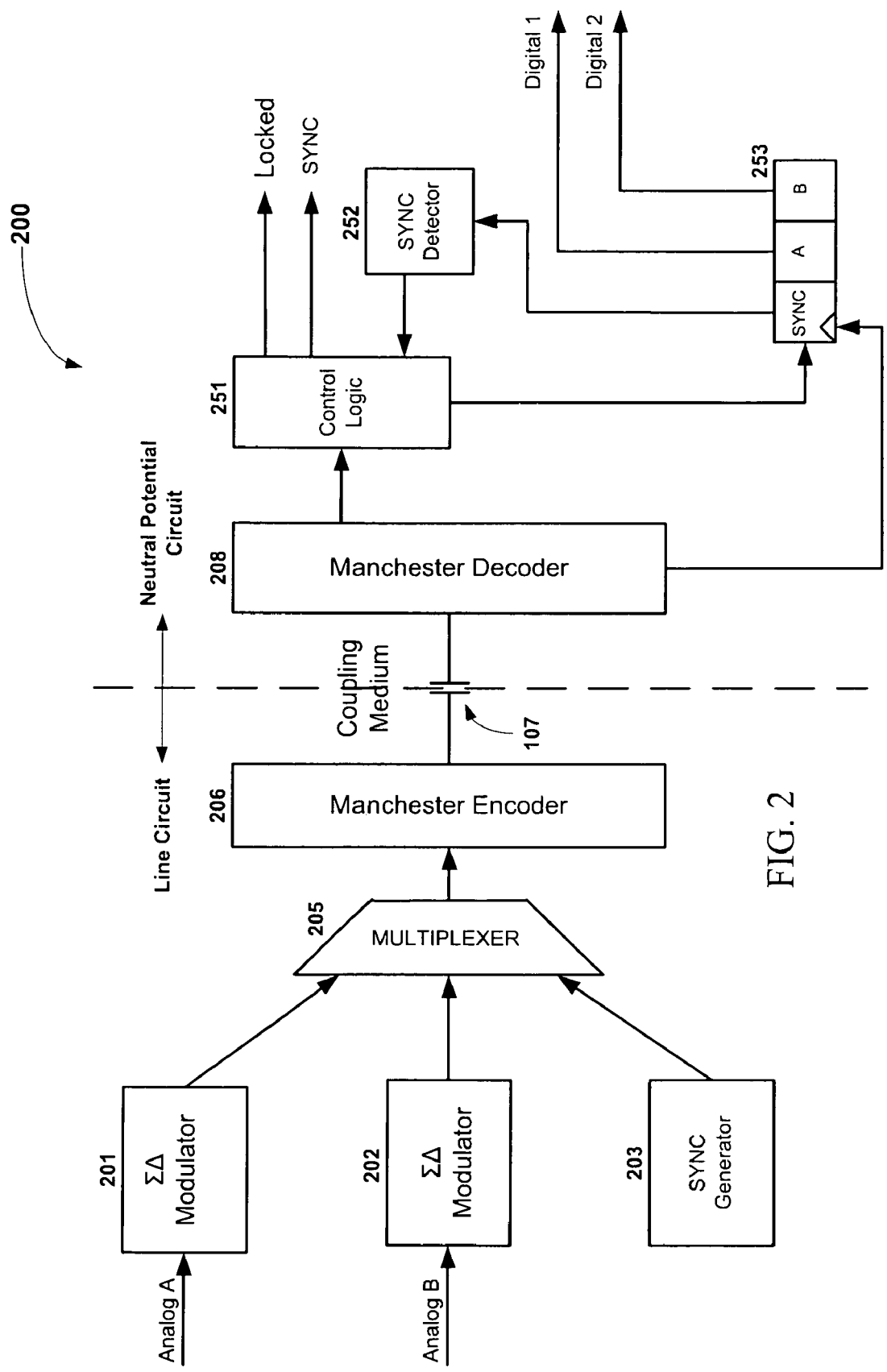
FIG. 2 is a block diagram for a three phase electricity usage meter, according to various embodiments of the invention.

FIG. 2 illustrates an embodiment of the present invention that may be found in electricity meter usage devices. In such embodiments, the analog signal to be sampled may comprise the voltage signal and current signal. The meter typically integrates three circuit with the functionality of FIG. 2, providing service for a three phase power system.

In the circuit represented by FIG. 2, the objective is to transfer the analog signals Analog A and Analog B across an isolation barrier represented by the dashed line to be represented by their digital equivalents Digital A and Digital B. To accomplish this transfer, each signal is converted to a bit stream by means of a well known sigma delta modulator 201 and 202. These modulators produce a bit stream, in which the aggregate proportion of time the bit stream is in the "1" state, is proportional to the level of the analog signal at its input. Each of these bit streams is coupled to a multiplexer 205. Also coupled to the multiplexer 205 is the output of a synchronization generator 203. This output consists of alternating "0" and "1" bits. Each input to the multiplexer is sampled in turn, producing a bit stream of the form given in FIG. 3. In this embodiment, Multiplexer 205 operation is based upon time division multiplex principles.

The bit stream is then presented to a well-known Manchester encoder 206. The output of a Manchester encoder is an encoded bit stream that contains no fewer than one signal level transition per bit, and can be decoded to recover the original composite unencoded bit stream and a bit synchronization clock. This encoder converts "0" and "1" bits into a representation in which each bit cell contains a "1" time and a "0" time of equal duration. In this arrangement, a "0" bit consists of a "1", half-bit period followed by a "0" half-bit period, and a "1" bit consists of a "0" half-bit period followed by a "1" half-bit period.

Figures 3, 4:
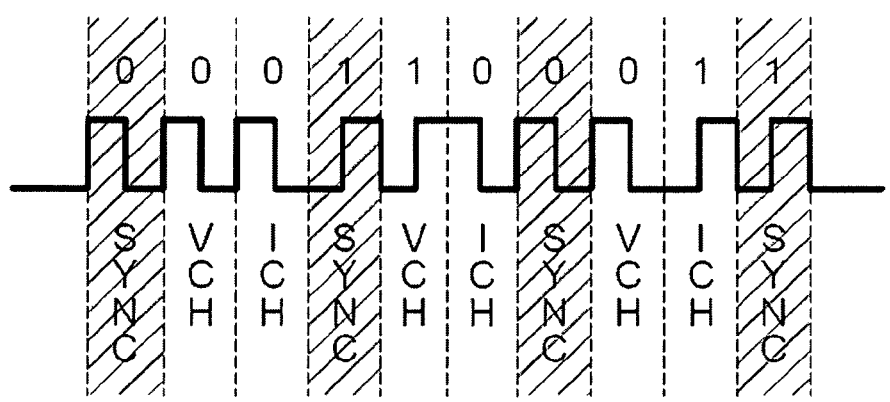
FIG. 3 is a table describing the bit times and values for a Manchester encoder, according to various embodiments of the invention.
FIG. 4 illustrates the output of a Manchester encoder, according to various embodiments of the invention.

Two characteristics of a Manchester encoded bit stream is that (1) regardless of the input, the output will have no DC offset, and (2) regardless of the input, there will not be a time greater than two half-bit periods without a signal transition. The typical output of the Manchester encoder 206 is given in FIG. 4. As shown in FIG. 4, "VCH" represents an encoded signal based upon Analog A of FIG. 2, and may indicate the voltage; and "ICH" represents an encoded signal of Analog B of FIG. 2, and may indicate the current. The waveform of FIG. 4 is suitable for coupling via a capacitive medium.

The isolation or coupling medium 107 may be provided by fabricating a high-voltage capacitor from printed circuit board material, or it could be provided from a commercially available high-voltage capacitor. The coupling medium 107 may be any capacitor of sufficient value and dielectric strength. In the preferred embodiment of this invention, the capacitor is a four-layer printed circuit board constructed of conventional glass-epoxy material with interleaved copper areas. Depending on the size of the copper areas and the thickness of the PCB, an arbitrarily high isolation voltage can be achieved in compliance with regulatory requirements (UL, VDE, CDA).

On the receiving side, or neutral potential circuit side, of FIG. 2, the capacitive-coupled signal is first passed to a Manchester decoder 208. This decoder recovers the two modulator bit streams and the synchronization stream and passes this bit stream to a shift register 253. Every three clocks, the control logic 251 issues a synchronization signal. The synchronization signal is, in fact, the alternating bit pattern that was produced by the Sync Generator 104. If so, the control logic 251 waits for a fixed number of synchronization signal periods and then issues a LOCK indication.

The synchronization detection mechanism may comprise a shift register, such as shift register 253, capable of accepting a serial bit stream and presenting a fixed number of bits of the bit stream in a parallel fashion, an alternating bit sequence detector, and a control logic block. The shift register has a bit length equal to the number of sample bit streams plus one. The additional bit accommodates the synchronization bit. The shift register may comprise one parallel output, which connects to the alternating bit sequence detector, and the other parallel outputs, which constitute outputs for the recovered sample bit streams.

If the synchronization detector 252 may determine that the first bit of the shift register 253 does not contain a sync signal, the control logic 251 injects an additional clock period into the sync output period, effectively slipping the shift register by one bit. Control logic 251 then waits to determine if the synchronization detector 22 can now detect the synchronization signal. This process repeats until the synchronization signal is detected.

The control logic block 251 receives inputs from the synchronization detection mechanism and from the bit synchronization clock from the Manchester decoder 208. The control logic block 251 also produces a lock indicator, which indicates the bit stream is valid when the lock indicator is active, when the lock indicator is inactive, the bit stream has an invalid status.

The control logic block 251 is further capable of producing an internal frame extension signal which has the states of "active" and "inactive". The control logic block 251 is further capable to produce a repetitive synchronization signal that is "active" during one period of the bit synchronization clock, and is subsequently "inactive" for a number of bit synchronization clock periods equal to the number of bit streams. The control logic block 251 is further capable to selectively extending the "inactive" period by one bit synchronization clock when the frame extension signal is in the "active" state.

The initial condition for the lock indication is "inactive". The initial condition for the internal frame extension signal is "inactive". The internal frame extension signal is capable of switching to the "active" state when the bit synchronization detector has been "inactive" for a fixed number of repetitive synchronization signal events. The internal frame extension signal, once activated, remains "active" for one period of the repetitive synchronization signal, after which it becomes "inactive".

The lock indicator is capable of switching to the "active" state after the frame extension signal has been "inactive" for a fixed number of repetitive synchronization signal events. The lock indicator is capable of switching to the "inactive" state after the frame extension signal has been "active" for a fixed number of repetitive synchronization signal events.

At the output of the neutral potential circuit, the digital streams may be directly converted back to analog by means of a low-pass analog filter, if desired (not shown on FIG. 2). In this embodiment, however, the modulator streams are passed to decimation filters. In this design, these decimation filters are implemented as $sinc^3$ filters. After a selectable period of time, each filter may contain a digital representation of the input signal level.

An electricity usage meter has the following properties:
1) The isolation element is an inexpensive, small, light PCB. In some embodiments of the invention, the isolation element can be a portion of the PCB that comprises the actual meter.
2) The level of isolation voltage can be easily customized by varying the thickness of the PCB material. Standard FR-4 can support 500V/mil.
3) FR4 is inherently flame retardant, and the isolation capacitors formed from this material dissipate no hear, enhancing safety.
4) The output is completely isolated from the input. Dangerous voltages appearing at the input are not present on the output side, due to the capacitive isolation.
5) Noise injected in the coupling circuit will cause only a momentary fluctuation in the output circuit. If a channel bit is changed form a "0" to a "1", only that channel is affected. Any if only a single synchronization bit is changed, the sync detector can simply skip over the error with no fault at all at the output.

One skilled in the art will recognize that the present invention may be applied to numerous applications. Some of these applications may include, but not be limited to, sensors, such as temperature, light or fluid sensors, video cams, and motion detectors.

The foregoing description of the invention has been described for purposes of clarity and understanding. It is not intended to limit the invention to the precise form disclosed. Various modifications may be possible within the scope and equivalence of the appended claims.

We claim:
1. An isolation circuit comprising:
  a first line circuit comprising:
    a plurality of data converters, coupled to receive input signals, the plurality of data converters samples and converts the inputs signals to a plurality of input digital signals;
    a multiplexer, coupled to receive the plurality of input digital signals and a synchronization signal, the multiplexer combines the plurality of input digital signals and the synchronization signal into an unencoded composite bit stream;
    a data encoder, coupled to receive the unencoded composite bit stream, the data encoder removes a DC bias from the unencoded bit stream and outputs a composite bit stream that is coupled to an isolation capacitor, the composite bit stream having a frequency above a threshold that allows the composite bit stream to be communicated across the isolation capacitor;
  a neutral potential circuit comprising:
    a data decoder, coupled to the isolation capacitor and to receive the composite bit stream, the data decoder decodes the composite bit stream, and generates a recovered data stream and a recovered clock;
    a control logic, synchronization and de-multiplex module, coupled to receive the recovered data stream and the recovered clock, the control logic, synchronization and de-multiplex module synchronizes the recovered data stream relative to the recovered clock and generates a plurality of output digital signals corresponding to the plurality of input signals; and
  wherein the first line circuit is in close proximity to a second line circuit, and a potential difference between the first and second line circuit is greater than 1500 volts.

2. The circuit of claim 1 wherein the plurality of data converters comprises a plurality of analog-to-digital converters, coupled to receive the plurality of input signals, the plurality of analog-to-digital converters converts the plurality of input signals into the plurality of input digital signals.

3. The circuit of claim 2 wherein at least a portion of the first plurality of input signals correspond to a voltage signal and a current signal of an electricity usage metering device.

4. The circuit of claim 3 wherein the plurality of data converters comprises a plurality of sigma delta modulators.

5. The circuit of claim 1 wherein the synchronization signal is an alternating bit generator.

6. The circuit of claim 1 wherein the data encoder comprises a Manchester encoder that generates the composite bit stream which contains no fewer than one signal level transition per bit, and the data decoder comprises a Manchester decoder that decodes the encoded composite bit stream.

7. The circuit of claim 1 wherein the control logic, synchronization and de-multiplex module comprises an N+1 bit shift register that receives the recovered clock and provides a synchronization bit to a synchronous detector, which generates a synchronization control signal.

8. The circuit of claim 7 wherein the control logic, synchronization and demultiplex module further comprises control logic circuitry, coupled to receive the recovered data stream from the decoder and the synchronization control signal from the synchronous detector, the control logic circuitry generates a synchronous signal output equivalent to the input synchronization signal, and a lock indicator output that has a lock indication status after a fixed number of successful synchronization signal periods.

9. The circuit of claim 8 wherein the synchronization detector interprets the synchronization bit and transmits a synchronization control signal to the control logic circuitry, the synchronization control signal providing a synchronization status indication.

10. The circuit of claim 9 wherein the control logic circuitry inserts an additional clock period into the synchronization output period in response to the synchronization detector determining that a first bit of the shift register does not contain a synchronization signal, and wherein the control logic circuitry waits a period of time to determine if the synchronization detector subsequently detects the synchronization signal.

11. The circuit of claim 9 wherein the lock indicator output indicates that a bit stream has a valid status when the lock indicator output is active and the bit stream has an invalid status when the lock indicator output is inactive.

12. The circuit of claim 11 wherein the control logic circuitry is further capable of producing an internal frame extension signal which has states of active and inactive.

13. The circuit of claim 12 wherein:
  the control logic circuitry is further capable of producing a repetitive synchronization signal that is active during one period of the bit synchronization clock and is subsequently inactive for a number of bit synchronization clock periods equal to the number of bit streams; and wherein the control logic circuitry is further capable of selectively extending the inactive period by one bit synchronization clock when the frame extension signal is in the active state.

14. The circuit of claim 13 wherein the lock indicator signal has an initial condition of inactive.

15. The circuit of claim 13 wherein the internal frame extension signal has an initial condition of inactive.

16. The circuit of claim 13 wherein the internal frame extension signal is capable of switching to the active state when the bit synchronization detector has been inactive for a fixed number of repetitive synchronization signal events.

17. The circuit of claim 13 wherein the internal frame extension signal once activated, remains active for one period of the repetitive synchronization signal, the internal frame extension signal becomes inactive once the one period has expired.

18. The circuit of claim 13 wherein the lock indicator is capable of switching to the active state after the frame extension signal has been inactive for a fixed number of repetitive synchronization signal events.

19. The circuit of claim 13 wherein the lock indicator is capable of switching to the inactive state after the frame extension signal has been active for a fixed number of repetitive synchronization signal events.

20. The circuit of claim 1 wherein multiple neutral potential circuits are integrated on a single monolithic semiconductor device.

21. The circuit of claim 1 wherein the isolation capacitor is fabricated using a high-voltage capacitor from a printed circuit board material.

22. A method for transferring a plurality of input signals across an isolation media, the method comprising the steps:
sampling and converting each of the plurality of input signals to generate a plurality of input digital signals;
generating a synchronization signal having a repeating bit pattern;
multiplexing the plurality of input digital signals and the synchronization signal into a unencoded composite bit stream;
encoding the unencoded composite bit stream by removing at least a portion of a DC bias on the unencoded composite bit stream, and placing no more than one signal transition within a bit slot such that an encoded composite bit stream is generated, wherein the encoded composite bit streams has a frequency that allows transmission through an isolation capacitor;
transmitting the encoded composite bit stream across the isolation capacitor;
decoding the encoded composite bit stream and generating a recovered synchronization signal and a recovered data signal;
further decoding the recovered data signal utilizing the recovered synchronization signal and outputting a plurality of output digital signals corresponding to the plurality of input digital signals;

wherein a plurality of circuits are present, each circuit implementing the sampling and combining steps on a corresponding plurality of input signals, the plurality of circuits being in close proximity to one another and the plurality of circuits having a potential difference greater than 1500 volts.

23. The method of claim 22 further comprising the step of converting input data with a plurality of analog-to-digital converters, coupled to receive the first plurality of input signals, the plurality of analog-to-digital converters converts the plurality of input signals into the plurality of input digital signals.

24. The method of claim 23 wherein the first plurality of input signals corresponds to a voltage signal and a current signal of an electricity usage metering device.

25. The method of claim 22 wherein a plurality of sigma delta modulators performs the steps of sampling and converting each of the plurality of input signals to generate a plurality of input digital signals.

26. The method of claim 22 further comprising the step of generating the encoded composite bit stream which contains no fewer than one signal level transition per bit with a Manchester encoder, and decoding the encoded composite bit stream with a Manchester decoder.

27. An isolation circuit comprising:
a first line circuit comprising:
a sigma delta modulator, coupled to receive analog input signals, the sigma delta modulator samples and converts the analog inputs signals to a plurality of input digital signals;
a multiplexer, coupled to receive the plurality of input digital signals and a synchronization signal, the multiplexer combines the plurality of input digital signals and the synchronization signal into an unencoded composite bit stream;
a Manchester encoder, coupled to receive the unencoded composite bit stream, the Manchester encoder removes a DC bias from the unencoded composite bit stream, and outputs an encoded composite bit stream that is transmitted across an isolation capacitor, the encoded composite bit stream having a frequency that allows transmission through the isolation capacitor;
a neutral potential circuit comprising:
a Manchester decoder, coupled to the isolation capacitor and to receive the encoded composite bit stream, the Manchester decoder decodes the encoded composite bit stream, and generates a recovered data stream and a recovered clock;
a control logic, synchronization and de-multiplex module, coupled to receive the recovered data stream and the recovered clock, the control logic, synchronization and de-multiplex module synchronizes the recovered data stream relative to the recovered clock and generates a plurality of output digital signals corresponding to the plurality of input signals; and
wherein the first line circuit is in close proximity to a second line circuit, and a potential difference between the first and second line circuit is greater than 1500 volts.

* * * * *